United States Patent [19]
Koefod

[11] Patent Number: 5,531,931
[45] Date of Patent: Jul. 2, 1996

[54] CORROSION-INHIBITING SALT DEICERS

[75] Inventor: Robert S. Koefod, Minnetonka, Minn.

[73] Assignee: Cargill, Incorporated, Minneapolis, Minn.

[21] Appl. No.: 367,503

[22] Filed: Dec. 30, 1994

[51] Int. Cl.$^6$ .............................. C09K 3/18; C23F 11/12; C23F 11/18
[52] U.S. Cl. ....................... 252/387; 252/70; 252/389.61; 252/389.52; 252/389.62
[58] Field of Search ...................... 252/70, 387, 389.61, 252/389.62, 389.52

[56] References Cited

U.S. PATENT DOCUMENTS

| | | | |
|---|---|---|---|
| 3,227,654 | 1/1966 | Standish et al. | 272/70 |
| 3,779,927 | 12/1973 | Howel et al. | 252/70 |
| 4,094,686 | 6/1978 | Dubois | 106/253 X |
| 4,495,225 | 1/1985 | Ciuba et al. | 428/236 |
| 4,668,416 | 5/1987 | Neal | 252/70 |
| 4,692,259 | 9/1987 | Roman | 252/70 |
| 4,749,550 | 6/1988 | Goldie et al. | 422/19 |
| 4,803,007 | 2/1989 | Garber | 252/70 |
| 4,824,588 | 4/1989 | Lin | 252/70 |
| 4,986,925 | 1/1991 | Fiske | 252/70 |
| 4,990,278 | 2/1991 | Wyeth | 252/70 |
| 4,992,115 | 2/1991 | Ikeda | 148/261 |
| 5,130,052 | 7/1992 | Kreh et al. | 252/387 |
| 5,194,138 | 3/1993 | Manfeld et al. | 205/183 |
| 5,211,868 | 5/1993 | Ireland et al. | 252/70 |
| 5,238,592 | 8/1993 | Stankowiak et al. | 252/70 |
| 5,296,167 | 3/1994 | Murray | 252/387 |
| 5,302,307 | 4/1994 | Ireland | 252/70 |
| 5,356,492 | 10/1994 | Miller | 252/70 |
| 5,362,335 | 11/1994 | Rungta | 148/272 |
| 5,372,638 | 12/1994 | DePue et al. | 106/404 |
| 5,399,210 | 3/1995 | Miller | 148/273 |

FOREIGN PATENT DOCUMENTS

| | | |
|---|---|---|
| 2060125A | 8/1992 | Canada. |
| 2097024 | 10/1982 | United Kingdom. |

OTHER PUBLICATIONS

DE 4034217A (29 May 1991) abstract only.

Hinton et al., "The Inhibition of Aluminum Alloy Corrosion by Cerous Cations," *Metals Forum*, vol. 7, No. 4, p. 212 (1984).

Arnott et al., "Cationic Film–Forming Inhibitors for the Corrosion Protection of AA 7075[(1)] aluminum alloy in chloride solutions", *Materials Performance*, vol. 26, No. 8, p. 42 (1987).

Hinton et al., "The Inhibition of Aluminum Alloy Corrosion by Rare Earth Metal Cations", *Corrosion Australiasia*, p. 12 (1984).

Mor et al., "Zin Gluconate as an Inhibitor of the Corrosion of Mild Steel in Sea Water", *Br. Corros. J.*, 1976, vol. 11, No. 4.

Pandya R. P. et al. "Inhibition of Corrosion of Mild Steel in Sea Water Using Gluconates", Central Salt & Marine Chemicals Research Institute, Bhavnagar, 10th International Congress on Metallic Corrosion, V. 3., Madras, India, 7–11, Nov. 1987, p. 2849.

Hinton et al., "The Characteristics of Corrosion Inhibiting Films Formed in the Presence of Rare Earth Cations", *Microstructural Science*, Vol. 17, p. 311.

*Primary Examiner*—Gary Geist
*Assistant Examiner*—Valerie Fee
*Attorney, Agent, or Firm*—Fitch, Even, Tabin & Flannery

[57] ABSTRACT

Salt-based deicing compositions which are highly effective as deicers and which have significantly reduced corrosive effects are provided. One deicing composition comprises a deicing salt as the major component and an inhibitor system comprising either a water-soluble rare earth salt or a water-soluble organic acid salt selected from the group consisting of gluconate salts, ascorbate salts, tartrate salts, and saccharate salts. A more preferred deicing composition comprises a deicing salt as the major component and an inhibitor system comprising a mixture of a water-soluble rare earth salt and a water-soluble organic acid salt selected from the group consisting of gluconate salts, ascorbate salts, tartrate salts, and saccharate salts. The deicing salts include sodium chloride and mixtures of sodium chloride and up to 25 weight percent magnesium chloride or calcium chloride. The preferred deicing salt is sodium chloride. Generally, the preferred water soluble rare earth salt is a lanthanum salt or mixture of rare earth salts containing lanthanum salts. The preferred water-soluble organic acid salt is a gluconate salt.

36 Claims, No Drawings

CORROSION-INHIBITING SALT DEICERS

FIELD OF THE INVENTION

This invention generally relates to the field of deicing compositions. More specifically, this invention relates to deicing compositions and methods of deicing roadways and associated structures which are less corrosive to both the infrastructure and vehicles.

BACKGROUND OF THE INVENTION

Sodium chloride and alkaline earth salts such as magnesium chloride are used extensively and in large quantities on roads and other structures for melting snow and ice. These agents generally work extremely well in deicing applications, but have several drawbacks. Sodium chloride's effectiveness as a deicer, its wide availability, and its low cost has made it one of, if not the most, widely used deicer. Unfortunately, salt is also a leading cause of structural corrosion of the nation's bridges and highways, concrete spalling, and vehicle corrosion.

Various additives have been proposed for mixing with salts to aid in inhibiting corrosion caused by the salts. For example, British Patent 1,328,509 to Bishop et al. describes a composition suitable for use in the inhibition of corrosion caused by salt, which includes a water soluble polyphosphate and a surface active agent (e.g., various amine compounds). E. E. Steed, Road Research Laboratory, Ministry of Transport, Report LR268-1969, reports that polymetaphosphate inhibitors which require the presence of calcium ions are effective as a corrosion inhibitor for brine solutions. Other phosphate-based inhibitors and deicing compositions have been used to lessen the corrosive effects of sodium chloride. Generally, however, the required amount of such phosphate compounds or inhibitors is relatively large and present environmental concerns.

There remains a serious need to provide a low cost deicing composition which reduces corrosion caused by sodium chloride. Thus, it would be highly desirable to develop a corrosion inhibiting, low cost, salt-based deicer composition that has considerably less residual impact on corrosion of the nation's highways and bridges as well as vehicles using those highways and bridges. It would also be highly desirable if such alternative salt-based deicer compositions only required relatively low levels of corrosion inhibitors and possessed, therefore, limited environmental concerns. It would also be highly desirable if the inhibitor system used in such alternative salt-based deicer composition did not interfere with the deicing rate of the salt and did not accelerate concrete spalling. The compositions and methods of this invention generally provide such characteristics.

The present invention is directed to providing corrosion resistant, low cost, solid deicing compositions which are suitable for use on highways, bridges, sidewalks, and the like. Accordingly, one of the principle objects of the invention is to provide deicing compositions which deice rapidly. Another object of this invention is to provide deicing compositions which cause reduced levels of corrosion to vehicles. Yet another important object of this invention is to provide deicing compositions which primarily utilize sodium chloride as a cost effective deicer, but reduce the highly corrosive effect of sodium chloride on vehicles.

Another object of the present invention is to provide a deicing composition comprising about 94.0 to 99.8 weight percent of a deicing salt, about 0.1 to 3.0 weight percent of a water-soluble rare earth salt, and about 0.1 to 3.0 weight percent of a water-soluble organic acid salt selected from the group consisting of gluconate salts, ascorbate salts, tartrate salts, and saccharate salts.

Still another object of the present invention is to provide a deicing composition comprising at least about 90 weight percent of sodium chloride, an effective corrosion-inhibiting amount of a water-soluble rare earth salt, and an effective corrosion-inhibiting amount of a water-soluble organic acid salt, wherein the rare earth salt is a water-soluble lanthanum salt, a water-soluble cerium salt, a water-soluble praseodymium salt, a water-soluble neodymium salt, or a mixture thereof and wherein the water-soluble organic acid salt is a gluconate salt, an ascorbate salt, a tartrate salt, or a saccharate salts.

Still another object of the present invention is to provide a method for deicing ice- or snow-covered surfaces, said method comprising applying an effective amount of a deicing composition to the surface to be deiced and allowing the deicing composition to melt or partially melt the ice or snow covering the surface, wherein the deicing composition comprises about 94.0 to 99.8 weight percent of a deicing salt, about 0.1 to 3.0 weight percent of a water-soluble rare earth salt, and about 0.1 to 3.0 weight percent of a water-soluble organic acid salt selected from the group consisting of gluconate salts, ascorbate salts, tartrate salts, and saccharate salts.

Still another object of this invention is to provide a deicing composition comprising about 94.0 to 99.5 weight percent of a deicing salt and about 0.5 to 6.0 weight percent of a corrosion inhibitor, wherein the corrosion inhibitor is selected from the group consisting of water-soluble rare earth salts, water-soluble gluconate salts, water-soluble ascorbate salts, water-soluble tartrate salts, and water-soluble saccharate salts.

These and other objects and advantages of the of the present invention will become apparent from the following description.

SUMMARY OF THE INVENTION

The present invention relates to salt-based deicing compositions which are highly effective as deicers and which have significantly reduced corrosive effects. The deicing salt forming the major component of these salt-based deicing compositions is sodium chloride or a mixture of at least about 75 weight percent sodium chloride and less than about 25 weight percent magnesium chloride or calcium chloride. The preferred deicing salt is sodium chloride. These salt-based deicing compositions use an inhibitor system comprising a water-soluble rare earth salt and/or a water-soluble organic acid salt selected from the group consisting of gluconate salts, ascorbate salts, tartrate salts, and saccharate salts. The deicing compositions may contain a single corrosion inhibitor (i.e., either a water-soluble rare earth salt or a water-soluble organic acid salt) or, more preferably, a mixture of a water-soluble rare earth salt and a water-soluble organic acid salt. Generally, the preferred water soluble rare earth salt is a lanthanum salt or a mixture of rare earth salts containing a lanthanum salt. The preferred water-soluble organic acid salt is a gluconate salt. The deicing compositions of this invention provide a preferred alternative to sodium chloride or other salt-based deicing compositions (i.e., phosphate-inhibited sodium chloride) for deicing roads, highways, bridges, sidewalks, and the like as well as other deicing applications.

DETAILED DESCRIPTION OF THE INVENTION

The present invention provides a solid deicing composition containing, in major portion, a deicing salt and in minor and corrosion-inhibiting portions, a water-soluble rare earth salt and/or a water-soluble organic acid salt. Preferably, the corrosion-inhibiting portion contains a mixture of a water-soluble rare earth salt and a water-soluble organic acid salt. Generally, the deicing compositions contain at least 90 weight percent deicing salt, preferably at least 94 percent deicing salt, and more preferably at least 96 percent deicing salt, on a dry weight basis. The deicing compositions of the present invention can contain a single corrosion inhibitor selected from the group consisting of water-soluble rare earth salts and water-soluble organic acid salts or, more preferably, a mixture of water-soluble rare earth salts and water-soluble organic acid salts. When using a single corrosion inhibitor, the deicing composition will generally contain, on a dry weight basis, about 94.0 to about 99.5 weight percent, and preferably about 95.0 to 99.0 weight percent, deicing salt; and about 0.5 to 6.0 weight percent, and preferably about 1.0 to 5.0 weight percent, of a corrosion inhibitor selected from the group consisting of water-soluble rare earth salts and water-soluble organic acid salts. When using a mixture of corrosion inhibitors, the deicing composition will generally contain, on a dry weight basis, about 90.0 to about 99.8 weight percent, preferably about 94.0 to 99.6 weight percent, and more preferably about 96.0 to 99.6, deicing salt; about 0.1 to 5.0 weight percent, and preferably about 0.2 to 3.0 weight percent, of the water-soluble rare earth salt; and about 0.1 to 5.0 weight percent, and preferably about 0.2 to 3.0 weight percent, of the water-soluble organic acid salt. Even more preferably, the deicing composition of this invention will contain, on a dry basis, about 98.4 to 99.6 weight percent deicing salt, about 0.2 to 0.8 weight percent water-soluble rare earth salt, and about 0.2 to 0.8 weight percent water-soluble organic acid salt. The deicing compositions can, if desired, contain conventional deicer additives including, for example, anti-caking agents, deicing rate accelerators, colorants, and the like. Preferably, the deicing compositions of the present invention are phosphate free.

The actual corrosion inhibitors of this invention include water-soluble rare earth salts, water-soluble organic acid salts, or, more preferably, mixtures of a water-soluble rare earth salt and a water-soluble organic acid salt. When the corrosion inhibitor is added to a substantially dry deicing salt, the resulting composition is an effective deicing composition with significantly reduced corrosion effects. In fact, some aqueous solutions containing about 3 weight percent of the deicing composition of this invention (i.e., deicing salt, water-soluble rare earth salt, and/or water-soluble organic acid salt), which gave good deicing characteristics, exhibited corrosion rates less than salt-free water; in other words, the reduction in corrosion was greater than 100 percent. Moreover, the combination of corrosion inhibitors of this present invention demonstrate a synergistic corrosion-inhibition effect. For example, significantly lower total concentrations of the two corrosion inhibitors (i.e., rare earth salt and organic acid salt) can provide essentially equivalent corrosion inhibition to higher concentration of the two inhibitors when used alone. The individual corrosion inhibitors are, however, still effective when used alone and can, if desired, be used in that manner. Preferably, however, the corrosion inhibitor is a mixture of a water-soluble rare earth salt and a water-soluble organic acid salt.

The deicing compositions of this invention may be prepared by simply mixing the corrosion inhibitors with the deicing salt or dissolving the corrosion inhibitors in an aqueous deicing salt solution or an aqueous solution to which the deicing salt will be added. Deicing salts of the present invention include sodium chloride and mixtures of sodium chloride with up to about 25 weight percent magnesium chloride or calcium chloride. Generally, sodium chloride is the preferred deicing salt.

Suitable rare earth salts generally include water-soluble salts of the rare earth elements. Preferably, such rare earth elements are those with atomic numbers of 57–60 (i.e., lanthanum, cerium, praseodymium, and neodymium); lanthanum is a preferred rare earth element for use in forming the water-soluble rare earth salts used in this invention. Preferably the anion of the water-soluble rare earth is a chloride, nitrate, acetate, or sulfate. Thus, examples of suitable water-soluble rare earth salts include lanthanum chloride, cerium chloride, praseodymium chloride, neodymium chloride, lanthanum nitrate, cerium nitrate, praseodymium nitrate, neodymium nitrate, lanthanum acetate, cerium acetate, praseodymium acetate, neodymium acetate, lanthanum sulfate, cerium sulfate, praseodymium sulfate, and neodymium sulfate. Preferred water-soluble rare earth elements include lanthanum chloride, lanthanum nitrate, lanthanum acetate, and lanthanum sulfate. A single water-soluble rare earth salt or a mixture of such water-soluble rare earth salts may be used. One preferred mixture of such water-soluble rare earth salts contains at least two salts selected from the group consisting of lanthanum chloride, cerium chloride, praseodymium chloride, and neodymium chloride. Another preferred mixture of such water-soluble rare earth salts contains about 58 to 68 weight percent lanthanum chloride, about 20 to 24 weight percent neodymium chloride, about 1 to 15 weight percent cerium chloride, and about 7 to 9 weight percent praseodymium chloride.

Suitable water-soluble organic acid salts generally include water-soluble gluconate salts, ascorbate salts, tartrate salts, and saccharate salts. Preferred cations for these water-soluble organic acid salts include, for example, alkali metal cations such as sodium and potassium, alkaline earth cations such as magnesium and calcium, and transition metal cations such as zinc, iron, and the like. Preferred water-soluble organic acid salts generally include water-soluble gluconate salts. Especially preferred water-soluble organic acid salts include sodium gluconate, potassium gluconate, magnesium gluconate, calcium gluconate, and zinc gluconate. A single water-soluble organic acid salt or a mixture of such water-soluble organic acid salts may be used in the deicing compositions of the present invention. The organic acid salt may be added directly as a salt or as a free acid which can be converted into a salt in situ with an appropriate base (e.g., magnesium, calcium, potassium, or sodium hydroxides or oxides).

The water-soluble rare earth salts and the water-soluble organic acid salts may be added as separate compounds, as water-soluble complexes of the rare earth and organic acid salts, or as mixtures thereof. Generally, it is preferred that the water-soluble rare earth salts and/or water-soluble organic acid salts are added to the deicing compositions as separate compounds. One especially preferred corrosion-inhibitor combination is a water soluble lanthanum salt and a water-soluble gluconate salt wherein the two salts are added as separate compounds.

The improved deicer compositions can be applied to a surface to be deiced (including, for example, a highway, bridge, sidewalk, or the like) as an essentially dry composition or dissolved in an aqueous media and applied as a solution. Conventional application and spreading techniques can be used to apply the present deicing compositions. In some cases, it may be desirable to first apply an aqueous solution of the present deicers followed by application of the dry, particulate deicer. Pre-wetting with an aqueous solution of the deicers of the present invention may be carried out prior to expected snow or ice events to provide anti-icing effects. Such a pre-wetting application may also be carried out prior to application of the dry deicer to provide better adherence of the dry deicer to the surface to be deiced and thereby improve deicing efficiency. Although it is preferred that the dry deicer that follows the pre-wetting application be of similar kind as provided by this invention to ensure maximum corrosion protection, the later-applied dry deicer could, if desired, lack corrosion inhibitors altogether (the least preferred method) or contain other corrosion-inhibiting systems.

When the deicer composition is used and applied as a dry composition, the corrosion inhibitors (i.e., water-soluble rare earth salt, water-soluble organic acid salt, or mixtures thereof) should be evenly distributed throughout the deicer composition to ensure that the entire deicing composition has the desired corrosion-inhibiting effect. Such an essentially homogenous distribution can be obtained using conventional particulate handling and mixing techniques. Preferably, when used as an essentially dry deicing composition, the average particle size of the particulate deicing composition should be in the range of about 0.5 to 2.0 mm, and more preferably in the range of about 0.59 to 1.91 mm. When contained as an aqueous solution, such an aqueous deicing solution should normally contain up to about 26 weight percent, preferably about 20 to 26 weight percent, and more preferably about 24 to 26 weight percent, of the deicing composition. In such an aqueous composition, the homogenous distribution of the corrosion-inhibiting components can easily be obtained (so long as there is adequate mixing) since all components are dissolved in the water carrier.

The deicing compositions of this invention generally have ice melting characteristics similar to deicing salt alone (e.g., sodium chloride without added corrosion inhibitors or other components). If desired, the deicing compositions of this invention may further contain other additives, such as, for example, anti-caking agents, deicing rate accelerators, colorants, and the like. Examples of such deicing rate accelerators include magnesium chloride hexahydrate, magnesium chloride dihydrate, calcium chloride, and the like. Generally, magnesium chloride hexahydrate is the preferred deicing rate accelerator. When used, such deicing rate accelerators are normally present at levels of about 15 to 25 weight percent based on the dry weight of the deicing salt, water-soluble rare earth salt, and water-soluble organic acid salt.

The following examples are intended to further illustrate the invention and not to limit it. Unless noted otherwise, all percentages are by weight.

EXAMPLE 1

The corrosion-inhibiting effect of various deicer compositions was measured using an alternate immersion corrosion test with 2×3 inch S.A.E. 1010 carbon steel panels. The panels were first degreased in hexane, rinsed in methanol, and dried. Small holes were drilled in each panel to allow the panels to be suspended from a glass rod into the desired test solution. Each panel was labelled and then weighed to the nearest tenth milligram after drying. Generally, aqueous deicing compositions containing about three percent of the test deicer compositions by dry weight basis were prepared. Two control solutions were used: (1) deionized water without any added deicer salt or corrosion inhibitors (percent protection=100%) and (2) salt solution (3 percent deicer salt) without added corrosion inhibitors (percent protection= 0%). Generally, four panels were suspended in each test solution such that each panel was completely submerged. Corrosion tests were generally conducted for 14 days. During the work week, each panel was removed from the test solution twice a day for a one hour period and allowed to dry exposed to the air. During the weekends, the panels remained immersed in the test solution. At the end of each week, the test solutions were removed and replaced with new solutions of the same type. At the end of the test, the panels were removed and cleaned with 1820 g hot water, 180 g concentrated hydrochloric acid, and 2 g of Rodine 213. The panels were weighed and the corrosion rates, in units of mils per year (MPY), were calculated from the weight loss. Using these MPY values, the percent protection against salt induced corrosion was calculated using the following equation:

$$Percent\ Protection = 100 \times [(M_s - M_d)/(M_s - M_w)],$$

where $M_s$ is the average corrosion rate in MPY for a plain salt solution, $M_d$ is the average corrosion rate in MPY for the test deicer (3% in an aqueous solution), and $M_w$ is the average corrosion rate in MPY for deionized water. A percent protection value of 0% would be equivalent to a 3 percent salt solution (no added inhibitors), a value of 100% would be equivalent to deionized water (no added salt or inhibitors). Thus, a percent protection greater than 100% indicates that the test solution is less corrosive than deionized water.

Several deicer compositions were tested. Each deicer composition was dissolved in water to give 900 g of an aqueous solution containing 3 weight percent deicer composition. Two by three inch steel test panels were exposed to the various test solutions for 14 days. Throughout the examples, "LnCl$_3$" is a mixture of rare earth or lanthanide salts containing about 58 to 68 weight percent lanthanum chloride, about 20 to 24 weight percent neodymium chloride, about 1 to 15 weight percent cerium chloride, and about 7 to 9 weight percent praseodymium chloride. The LnCl$_3$ used in the examples was obtained from Molycorp, Inc. (Product Number 5240, lot number B-1209). Consistently, the best results were obtained with deicer compositions containing both rare earth salts and sodium gluconate. However, satisfactory results were obtained using either a rare earth salt or an organic acid salt as the only inhibitor. The results of these corrosion tests are summarized in the Table below.

| Deicer Composition | Percent Protection |
| --- | --- |
| 5% sodium gluconate<br>95% sodium chloride | 125 |
| 3% LnCl$_3$.6H$_2$O<br>1% sodium gluconate<br>96% sodium chloride | 139 |
| 3% LnCl$_3$.6H$_2$O<br>97% sodium chloride | 133 |
| 2.5% sodium gluconate<br>97.5% sodium chloride | 110 |
| 3% LnCl$_3$.6H$_2$O<br>2% sodium gluconate<br>95% sodium chloride | 137 |

-continued

| Deicer Composition | Percent Protection |
|---|---|
| 1.5% LnCl$_3$.6H$_2$O<br>98.5% sodium chloride | 118 |
| 1.5% LnCl$_3$.6H$_2$O<br>3.5% sodium gluconate<br>95% sodium chloride | 143 |
| 3% LnCl$_3$.6H$_2$O<br>97% sodium chloride | 133 |
| 1.5% LnCl$_3$.6H$_2$O<br>1.8% sodium gluconate<br>96.7% sodium chloride | 140 |
| 1.5% LnCl$_3$.6H$_2$O<br>3.5% sodium gluconate<br>95% sodium chloride | 142 |
| 5% sodium gluconate<br>95% sodium chloride | 126 |
| 0.8% LnCl$_3$.6H$_2$O<br>3.4% sodium gluconate<br>95.8% sodium chloride | 135 |

EXAMPLE 2

This example shows that low levels of inhibitors can effectively inhibited corrosion. The compositions described in the table below were tested essentially as described in Example 1. The corrosion results are presented in the following table.

| Deicer Composition | Percent Protection |
|---|---|
| 2.5% sodium gluconate<br>97.5% sodium chloride | 78 |
| 1.0% sodium gluconate<br>99% sodium chloride | 59 |
| 0.5% sodium gluconate<br>99.5% sodium chloride | 44 |
| 1.0% LnCl$_3$.6H$_2$O<br>99% sodium chloride | 87 |
| 0.5% LnCl$_3$.6H$_2$O<br>99.5% sodium chloride | 33 |
| 0.33% LnCl$_3$.6H$_2$O<br>0.33% sodium gluconate<br>99.34% sodium chloride | 77 |
| 0.17% LnCl$_3$.6H$_2$O<br>0.17% sodium gluconate<br>99.66% sodium chloride | 17 |
| 0.67% LnCl$_3$.6H$_2$O<br>0.17% sodium gluconate<br>99.16% sodium chloride | 90 |
| 0.17% LnCl$_3$.6H$_2$O<br>0.67% sodium gluconate<br>99.16% sodium chloride | 64 |
| 0.33% LnCl$_3$.6H$_2$O<br>0.33% sodium gluconate<br>99% sodium chloride | 73 |
| 0.5% LnCl$_3$.6H$_2$O<br>0.5% sodium gluconate<br>99% sodium chloride | 98 |
| 0.08% LnCl$_3$.6H$_2$O<br>0.08% sodium gluconate<br>99.84% sodium chloride | −3 |
| 0.8% LnCl$_3$.6H$_2$O<br>0.8% sodium gluconate<br>98.4% sodium chloride | 108 |
| 0.33% LnCl$_3$.6H$_2$O<br>0.33% sodium gluconate<br>99.3% sodium chloride | 89 |

A deicing composition containing 0.8% LnCl$_3$·6H$_2$O, 0.8% sodium gluconate, and 98.4% sodium chloride was evaluated using a SHRP H-205.1 Ice Melting Capacity Test at 5° F. This deicing composition had essentially the same deicing rate as a control sample consisting of sodium chloride (no added corrosion inhibitors). This same inventive deicing composition was evaluated using a SHRP H-205.9 Concrete Scaling Test. The deicing composition had essentially the same concrete scaling effect as the control sample. Thus, the deicing compositions of the present invention provide excellent deicing rates with significant corrosion-inhibiting effects but without increased concrete scaling effects.

EXAMPLE 3

This example further illustrates the corrosion inhibition of the deicer compositions of this invention containing both a rare earth salt and an organic acid salt. Corrosion inhibition was evaluated using the procedure of Example 1. The following results were obtained.

| Deicer Composition | Percent Protection |
|---|---|
| 0.5% LnCl$_3$.6H$_2$O<br>0.5% sodium gluconate<br>99% sodium chloride | 101 |
| 0.5% LnCl$_3$.6H$_2$O<br>0.6% sodium gluconate<br>98.9% sodium chloride | 108 |
| 0.5% LnCl$_3$.6H$_2$O<br>0.7% sodium gluconate<br>98.8% sodium chloride | 106 |
| 0.6% LnCl$_3$.6H$_2$O<br>0.5% sodium gluconate<br>98.9% sodium chloride | 102 |
| 0.6% LnCl$_3$.6H$_2$O<br>0.6% sodium gluconate<br>98.8% sodium chloride | 104 |
| 0.7% LnCl$_3$.6H$_2$O<br>0.6% sodium gluconate<br>98.7% sodium chloride | 100 |
| 0.6% LnCl$_3$.6H$_2$O<br>0.7% sodium gluconate<br>98.7% sodium chloride | 105 |
| 0.8% LnCl$_3$.6H$_2$O<br>0.8% sodium gluconate<br>98.4% sodium chloride | 92 |

That which is claimed is:

1. A deicing composition comprising about 94.0 to 99.8 weight percent of a deicing salt, about 0.1 to 3.0 weight percent of a water-soluble rare earth salt, and about 0.1 to 3.0 weight percent of a water-soluble organic acid salt selected from the group consisting of gluconate salts, ascorbate salts, tartrate salts, and saccharate salts.

2. A deicing composition as defined in claim 1, wherein the deicing salt is sodium chloride, the water-soluble rare earth salt is a chloride, nitrate, acetate, or sulfate salt of lanthanum, cerium, praseodymium, or neodymium, and the water-soluble organic acid salt is a gluconate salt.

3. A deicing composition as defined in claim 2, wherein the water-soluble rare earth salt is a mixture of at least two salts selected from the group consisting of lanthanum chloride, cerium chloride, praseodymium chloride, and neodymium chloride.

4. A deicing composition as defined in claim 1, wherein the water-soluble organic acid salt is selected from the group consisting of calcium gluconate, sodium gluconate, potassium gluconate, magnesium gluconate, and zinc gluconate.

5. A deicing composition as defined in claim 2, wherein the water-soluble organic acid salt is selected from the group consisting of calcium gluconate, sodium gluconate, potassium gluconate, magnesium gluconate, and zinc gluconate.

6. A deicing composition as defined in claim 3, wherein the water-soluble organic acid salt is selected from the group consisting of calcium gluconate, sodium gluconate, potassium gluconate, magnesium gluconate, and zinc gluconate.

7. A deicing composition as defined in claim 1, wherein the composition further contains an effective amount of a deicing rate accelerator.

8. A deicing composition as defined in claim 7, wherein the deicing rate accelerator is magnesium chloride hexahydrate.

9. A deicing composition comprising at least about 90 weight percent of sodium chloride, an effective corrosion-inhibiting amount of a water-soluble rare earth salt, and an effective corrosion-inhibiting amount of a water-soluble organic acid salt, wherein the rare earth salt is a water-soluble lanthanum salt, a water-soluble cerium salt, a water-soluble praseodymium salt, a water-soluble neodymium salt, or a mixture thereof and wherein the water-soluble organic acid salt is a gluconate salt, an ascorbate salt, a tartrate salt, or a saccharate salt.

10. A deicing composition as defined in claim 9, wherein the composition contains at least about 94.0 weight percent deicing salt, at least 0.1 weight percent of the water-soluble rare earth salt, and at least 0.1 weight percent of the water-soluble organic acid salt.

11. A deicing composition as defined in claim 10, wherein the water-soluble organic acid salt is a gluconate salt.

12. A deicing composition as defined in claim 11, wherein the water-soluble organic acid salt is calcium gluconate, sodium gluconate, potassium gluconate, magnesium gluconate, or zinc gluconate.

13. A deicing composition as defined in claim 12, wherein the water-soluble rare earth salt is a chloride, nitrate, acetate, or sulfate salt of lanthanum, cerium, praseodymium, or neodymium.

14. A deicing composition as defined in claim 12, wherein the water-soluble rare earth salt is a mixture of at least two salts selected from the group consisting of lanthanum chloride, cerium chloride, praseodymium chloride, and neodymium chloride.

15. A deicing composition as defined in claim 11, wherein the composition further contains an effective amount of a deicing rate accelerator.

16. A deicing composition as defined in claim 15, wherein the deicing rate accelerator is magnesium chloride hexahydrate.

17. A method for deicing ice- or snow-covered surfaces, said method comprising applying an effective amount of a deicing composition to the surface to be deiced and allowing the deicing composition to melt or partially melt the ice or snow covering the surface, wherein the deicing composition comprises about 94.0 to 99.8 weight percent of a deicing salt, about 0.1 to 3.0 weight percent of a water-soluble rare earth salt, and about 0.1 to 3.0 weight percent of a water-soluble organic acid salt selected from the group consisting of gluconate salts, ascorbate salts, tartrate salts, and saccharate salts.

18. A method as defined in claim 17, wherein the deicing salt is sodium chloride, wherein the water-soluble rare earth salt is a chloride, nitrate, acetate, or sulfate salt of lanthanum, cerium, praseodymium, or neodymium, and wherein the water-soluble organic acid salt is a gluconate salt.

19. A method as defined in claim 18, wherein the water-soluble rare earth salt is a mixture of at least two salts selected from the group consisting of lanthanum chloride, cerium chloride, praseodymium chloride, and neodymium chloride.

20. A method as defined in claim 17, wherein the water-soluble organic acid salt is selected from the group consisting of calcium gluconate, sodium gluconate, potassium gluconate, magnesium gluconate, and zinc gluconate.

21. A method as defined in claim 18, wherein the water-soluble organic acid salt is selected from the group consisting of calcium gluconate, sodium gluconate, potassium gluconate, magnesium gluconate, and zinc gluconate.

22. A method as defined in claim 19, wherein the water-soluble organic acid salt is selected from the group consisting of calcium gluconate, sodium gluconate, potassium gluconate, magnesium gluconate, and zinc gluconate.

23. A method as defined in claim 17, wherein the deicing composition is applied as an aqueous solution containing about 20 to 26 weight percent of the deicing composition.

24. A method as defined in claim 20, wherein the deicing composition is applied as an aqueous solution containing about 20 to 26 weight percent of the deicing composition.

25. A method as defined in claim 21, wherein the deicing composition is applied as an aqueous solution containing about 20 to 26 weight percent of the deicing composition.

26. A method as defined in claim 22, wherein the deicing composition is applied as an aqueous solution containing about 20 to 26 weight percent of the deicing composition.

27. A method as defined in claim 17, wherein the deicing composition is applied as an essentially dry particulate solid.

28. A method as defined in claim 20, wherein the deicing composition is applied as an essentially dry particulate solid.

29. A method as defined in claim 21, wherein the deicing composition is applied as an essentially dry particulate solid.

30. A method as defined in claim 22, wherein the deicing composition is applied as an essentially dry particulate solid.

31. A method as defined in claim 17, wherein the deicing composition further contains an effective amount of a deicing rate accelerator.

32. A method as defined in claim 31, wherein the deicing rate accelerator is magnesium chloride hexahydrate.

33. A method as defined in claim 23, wherein the deicing composition further contains an effective amount of a deicing rate accelerator.

34. A method as defined in claim 33, wherein the deicing rate accelerator is magnesium chloride hexahydrate.

35. A method as defined in claim 27, wherein the deicing composition further contains an effective amount of a deicing rate accelerator.

36. A method as defined in claim 35, wherein the deicing rate accelerator is magnesium chloride hexahydrate.

\* \* \* \* \*